May 4, 1948. L. C. BOWLING 2,440,794
MOTOR STEERING APPARATUS
Filed Feb. 9, 1945 3 Sheets-Sheet 1

Inventor
Leonard C. Bowling
By Jack A. Ashley
Joseph H. Ashley
Attorneys

Inventor
Leonard C. Bowling

May 4, 1948.  L. C. BOWLING  2,440,794

MOTOR STEERING APPARATUS

Filed Feb. 9, 1945  3 Sheets-Sheet 3

Leonard C. Bowling, Inventor

By Jack A. Ashley
Joseph H. Ashley
Attorneys

Patented May 4, 1948

2,440,794

UNITED STATES PATENT OFFICE 2,440,794

MOTOR STEERING APPARATUS

Leonard C. Bowling, Houston, Tex., assignor of one-half to Lee O. Koen, Houston, Tex.

Application February 9, 1945, Serial No. 576,956

10 Claims. (Cl. 180—79.2)

This invention relates to new and useful improvements in motor steering apparatus.

One object of the invention is to provide an improved power steering apparatus which in some respects, is an improvement upon my application, filed August 26, 1943, Serial No. 500,156, now Letters Patent No. 2,368,741, issued February 6, 1945.

A further object of the invention is to provide a power steering apparatus which lends itself to mounting the pressure fluid control on the steering arm, rather than on the drag link.

A further object of the invention is to provide a steering apparatus of the character described within the steering arm may be connected to the drag link in the usual manner and the power control embodied in said arm in a new and novel manner.

Another object of the invention is to provide an improved steering apparatus of the character described involving a steering arm including a pair of members, one of which is attached to the steering shaft and the other of which is connected to the drag; said members being independently movable and resiliently sustained, whereby their independent movements may be employed to actuate the pressure fluid control.

A construction designed to carry out the invention will be hereinafter described together with other features of the invention.

The invention will be more readily understood from a reading of the following specification and by reference to the accompanying drawing, wherein an example of the invention is shown, and wherein.

Figure 1:
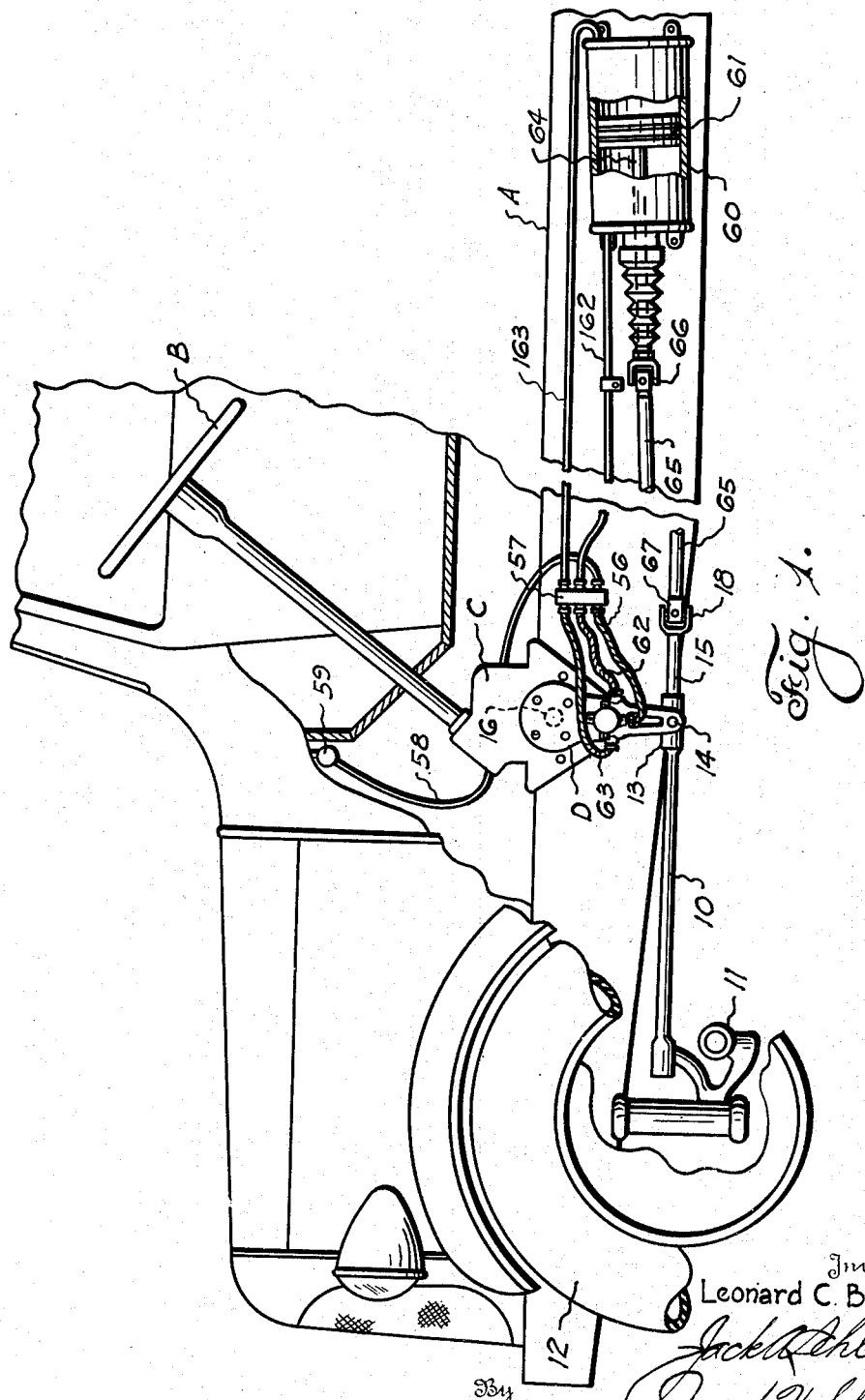
Fig. 1 is a fragmentary side view of a motor vehicle equipped with a power steering apparatus constructed in accordance with the invention.

In the drawings, the numeral 10 designates the ordinary drag link of a motor vehicle, which may be of any suitable construction according to the particular motor vehicle upon which the link is installed. As the invention resides more particularly in other elements, the usual steering connections to which the drag link is connected, will not be described in detail, but designated as the steering linkage 11 and the front wheels 12, to which said linkage is connected according to the manufacturer of the vehicle. The usual coupling sleeve 13 has its forward end connected to the rear end of the link 10 as is common in this art and receives the ordinary ball and socket connection 14 which is not illustrated in detail and whereby the link is moved forwardly and rearwardly.

A stub shaft 15 is fastened in the rear end of the sleeve 13 and carries a clevis 18. As in my copending application, Serial No. 500,156, this clevis receives the universal joint 67 connected to the forward end of the pitman 65 which is connected at its rear end by the universal joint 66 mounted on the forward end of the piston rod 64. The cylinder 60 is mounted on the frame A of the motor vehicle and the piston 61 is connected to the rear end of the piston rod. Similarly, a mounting block 57 is also secured to the frame A and connected by air lines 162 and 163 with the cylinder 60.

The steering wheel B is connected with the ordinary gear box C which is mounted on the frame A and from which the steering shaft 16 extends laterally. A steering arm designated generally by the letter D is mounted on this arm and secured at its lower end to the ball and socket connection 14, whereby the drag link 10 may be swung in the usual manner to move the latter longitudinally.

A crank 17 is fastened on the steering shaft 16 by means of a key 19 or in any other suitable manner. This crank has a hub 20 and a depending finger or lug 21. The steering arm D has a circular head 22 which has a snug turning fit on the hub 20 of the crank and is provided with a depending slot 23 in which the lug 21 may swing. The lower end of the arm is reduced in thickness as is indicated at 24 and may be cut out at 25, as a manufacturing expedient. The lower end of the arm is formed with an integral collar 26 which is attached to the ball and socket connection 14 in any suitable manner. Bowed springs 27 are interposed between each side of the lug 21 and the upright walls of the slot 23, whereby the arm and lug are held in a central or neutral position. The upper portion of the arm D is enclosed between cover plates 28 and 29 respectively, which may be suitably secured in the arm by machine screws 30, whereby the plates may be removed. These plates also function to confine a lubricant placed in the slot 23.

A valve mechanism similar to that used in my copending application, supra, and in some respects identical therewith, is carried by the arm D. A gear roller 31 is disposed transversely on the arm at the lower end of the slot 23 and is provided at its ends with reduced bearing trunnions 32 journalled in the plates 28 and 29. The longitudinal teeth of this gear roller mesh with transverse teeth 33 formed in the lower arcuate end of the lug 21 so that when the crank 17 is swung the roller will be rotated. The springs 27 will of course be under sufficient compression to resist yielding until a predetermined force has been applied in the swinging of the lug 21, so that until the resistance of these springs is overcome, the swinging of the crank 17 would also swing the arm D. However, when sufficient resistance is offered to th swinging of the arm D then the springs will yield and the roller 31 will be turned.

The trunnion 32 at the outer end of the roller 31 is extended and has a collar 34 secured thereon and bearing against the cover plate 29, which is on the outer side of the link. The collar 34 has a snug fit in a circular recess 35 formed in the face of a valve disk 36 which latter bears against the outer side of the cover plate 29 and is rotatably confined in a valve cap 37, which is suitably fastened on said plate. The collar 34 is provided with an integral transverse key 38 snugly engaging in a seat 39 in the valve disk. The contacting surfaces of the plate 29 and the valve disk are preferably machined so as to provide a fluid-tight contact therebetween. The disk is held in engagement with the plate by coiled spring 40 having one end surrounding a boss 41 on the disk and its other end seated in a recess 42 in the top of the chamber 43 of the cap.

The machine face of the plate 29 may be designated as a valve seat 44. This seat is provided with ports 51, 52 and 53 disposed in an arc concentric to the longitudinal axis of the roller 31 and equidistant therefrom. The central port 51 forms an exhaust or vent and is connected with an angular duct or vent passage 54 formed in the arm D and communicating with the opening 25. Lateral passage 52' and 53' extend respectively, from the ports 52 and 53 through the arm to the opposite edges thereof.

Figure 6:
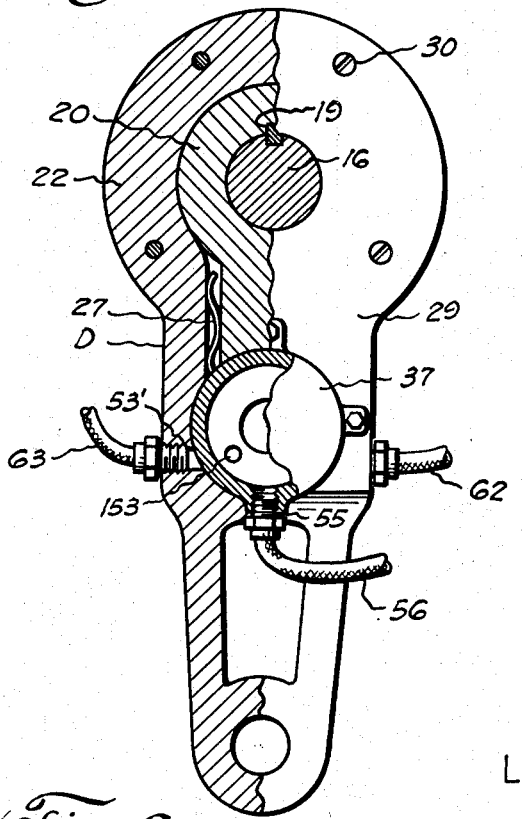
Fig. 6 is a view of the steering arm and its connections, partly in elevation and partly in section.

The valve cap 37 has an internally screw-threaded nipple 55 depending therefrom and communicating with the chamber 43 above the disk 36. As is shown in Figs. 1 and 6 a flexible air feed line 56 is suitably connected to the nipple 55 and also to the connecting block 57. The usual air supply line 58 is connected through the block 57 with the line 56 and may include a suitable pressure regulator 59. Any suitable mechanism (not shown) may be provided for supplying air or liquid to the line 58, such mechanism being well known and in common use in this art. By means of the foregoing connections, the chamber 43 is constantly maintained full of fluid under working pressure.

Figure 4:
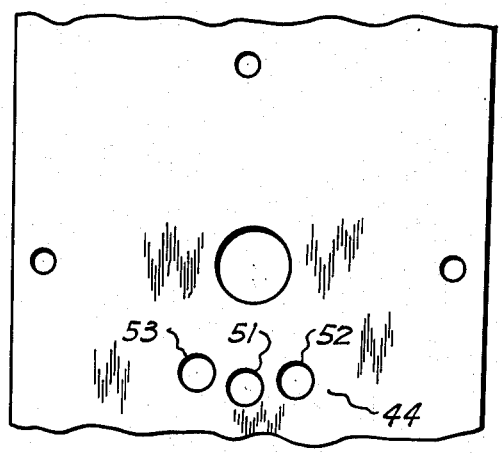
Fig. 4 is an elevation of a portion of the steering arm showing the valve seat.
Figure 5:
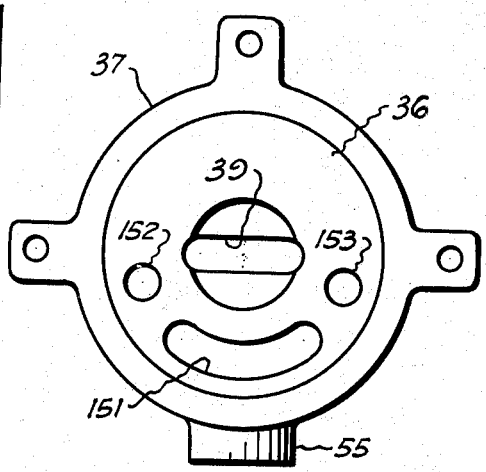
Fig. 5 is an underside view of the cap and valve disk.

The valve disk 36 has a pair of arcuately spaced ports 152 and 153 which extend entirely therethrough. An arcuate duct 151 is formed in the underside or face of the disk between these ports, but does not connect therewith. The ports 152 and 153 and the duct 151 are located in an arc having the same radius as the arc in which the ports 51, 52 and 53 are disposed, and at the same distance from the axis of the roller 31. When the disk is in its neutral or central position as shown in Figs. 4, 5 and 6, the lower ends of the disk ports 152 and 153 are sealed by the valve seat 44 and no fluid can pass through these ports. At the same time, the duct 151 overlies the ports 51, 52 and 53, whereby the passages 52' and 53' are connected through the ports 51 and the vent passage 54 to the atmosphere. Thus, in neutral position the ports 52 and 53 and passages 52' and 53' are open to the atmosphere.

Referring again to Figs. 1, 2 and 6, it will be seen that the passage 52' is connected to a flexible air line 62, while the passage 53' is connected to a flexible air line 63, both being supported in the mounting block 57 and connected respectively, to the air lines 162 and 163. The line 163 is connected to the rear end of the air cylinder 60, while the line 162 is connected to the forward end of said cylinder. It is obvious that these connections are made in accordance with the particular steering gear to which the apparatus is applied, being arranged in harmony with the direction in which the arm D is swung to turn the front wheels to the right or left.

In describing the operation, it will be assumed that the valve disk 36 is in neutral position whereby the air lines 163, 63, 62 and 162 and the passages 52' and 53' are open to the atmosphere, by reason of the duct 151 overlying the ports 51, 52 and 53 and thus being connected in common with the vent passage 54. The steering wheel B of the motor vehicle will be in its straight way driving position, the steering arm D perpendicular and the front wheels 12 in normal driving position. Air under pressure is supplied by the lines 58 and 56 to the chamber 43 of the valve cap 37 and fills said chamber as well as the ports 152 and 153, but cannot escape because these ports are sealed by the valve seat 44. The piston 61 will be in its central or neutral position.

Figure 2:
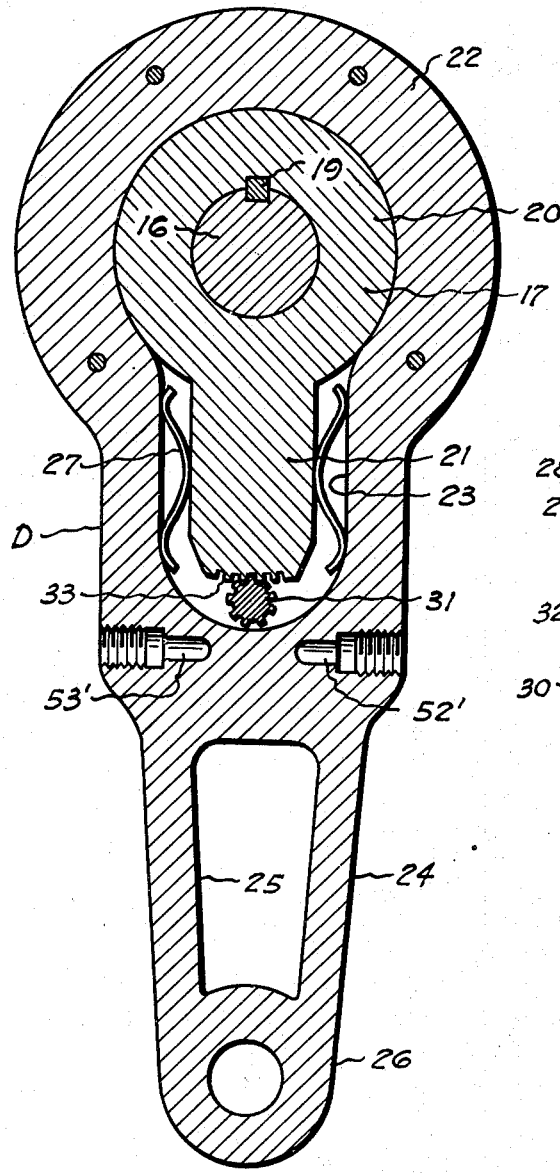
Fig. 2 is a vertical sectional view of the steering arm.
Figure 3:
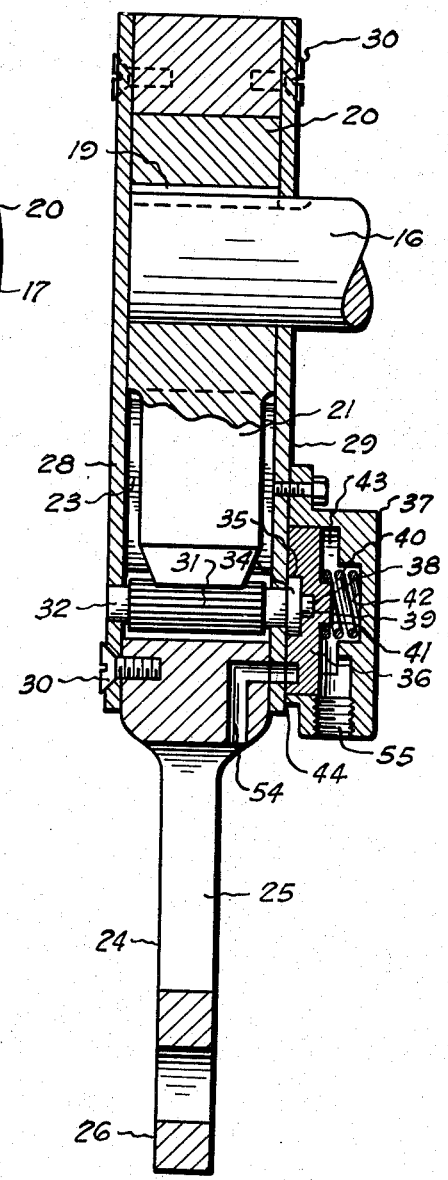
Fig. 3 is a similar view at right angles to Fig. 2.

If the driver turns the steering wheel B to the right or clockwise, the crank 17 will be swung rearwardly which, according to Fig. 2, would be to the right hand. Usually the frictional load placed upon the tires of the front wheels 12 will offer sufficient resistance so that the arm D will be held stationary and the righthand spring (Fig. 2) will yield, thus permitting the gear teeth 33 on the lower end of the lug 21 to rotate the roller 31 in a clockwise direction. This will turn the valve disk in a clockwise direction.

When the valve disk 36 is turned in a clockwise direction, the duct 151 will be moved out of communication with the port 52, but will maintain communication with the port 53, whereby the lines 163 and 63 leading from the rear of the cylinder will still be open to the atmosphere. At the same time, the port 153 will be moved into communication with port 52, whereby fluid will flow through port 52, passage 52' and line 62 and 162 to the forward end of the air cylinder 60. The port 153 will remain seated by the valve seat 44. When air is admitted to the forward end of the cylinder 60, the piston 61 will be forced rearwardly whereby the drag link 10 will be pulled rearwardly and the steering linkage 12 operated to swing the front wheels 12 to the right.

It will be observed that the ports 52 and 53 are close to the exhaust port 51, consequently if the driver should continue to turn the steering wheel to the right after the steering linkage 11 reached the limit of its righthand turning range, the port 152 in the disk would be brought into communication with the port 51 so that instead of continuing to supply air to the cylinder 60, such air would be vented to the atmosphere and power turning of the wheels would be immediately discontinued, whereby injury to the apparatus and the steering mechanism would be avoided.

It is obvious that when the lug 21 is swung rearwardly and the righthand spring 27 (Fig. 2) is compressed, the steering arm D will not be swung rearwardly until it is so moved by the operation of the power of mechanism. However, when air is supplied to the front of the cylinder 60 and the drag link 10 moves rearwardly, the arm D will likewise be moved rearwardly which will cause the teeth of the roller 31 to roll across the teeth 33 of said lug until the parts assume the neutral or central position shown in Fig. 2. This operation will cause a reverse or counterclockwise movement of the roller 31 and the disk 36, whereby the supply of air will be cut off from the cylinder 60 and the parts will remain in the adjusted position unless the steering wheel B is turned in either direction. However, should the driver continue to turn the steering wheel to the right, the lug 21 will move rearwardly with the arm D, or lag or precede the same, according to the torque of the steering wheel mechanism as applied by the driver.

It is pointed out that at no time is the driver called upon to supply the energy to actually turn the front wheels 12; he can substantially "feel" the resistance offered to the torque of the steering wheel and thus has a sensitive and positive steering control. He can control the supply of air to the point where the wheels will be turned gradually or rapidly, or where they may be under constant turning pressure, as in an effort to swing said wheels out of a rut. His entire expenditure of force is confined to the actuation of the air valve. It will also be observed that so long as the compression of the springs 27 is substantially equalized, the lug 21 and the valve disk 36 will remain in a neutral position regardless of the position of the drag link. If the steering wheel is turned to the left, the operation is reversed.

By mounting the air control means entirely on the steering arm, a much more compact and simple construction may be employed. Much better protection against injury is given the mechanism and further, dust, water, and extraneous matter are more effectively excluded.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A motor vehicle steering arm including, a crank member adapted to be attached to the steering shaft of a motor vehicle, an arm member swinging on the crank member and carrying a fluid supply control valve and adapted to be attached to a motor vehicle drag link, said members being independently movable, and actuating means within the arm member for the valve having coacting elements connected with said members and operable thereby upon independent movement of either member.

2. A motor vehicle steering arm including, a crank adapted to be attached to the steering shaft of a motor vehicle, an arm member mounted to swing on said crank and adapted to be connected to the drag link of a motor vehicle, a fluid supply control valve mounted entirely on said arm member, and operating means for said valve carried by said arm member and operably connected with said crank.

3. A steering arm as set forth in claim 2, with resilient means interposed between the crank and the arm member for sustaining said arm member and said valve in a neutral position.

4. A motor vehicle steering apparatus including, in combination with a power steering apparatus, a steering arm including independently movable members one of which is adapted to be attached to the steering shaft and the other of which member is adapted to be attached to the steering linkage of a motor vehicle, a fluid supply control valve carried entirely on one of the arm members and having an exhaust connection and connections with the power steering apparatus, means for operating said valve carried by the arm members and connected with said valve, and springs interposed between said members.

5. A steering arm for a motor vehicle steering apparatus including, an inner member adapted to be attached to the steering shaft of a motor vehicle and an outer member mounted to swing relatively of the inner member and adapted to be attached to the steering linkage of a motor vehicle, resilient means connecting the members, coacting gearing elements carried by said members, and a fluid supply control valve carried by one of the members and connected with one of the gearing elements.

6. A motor vehicle steering apparatus as set forth in claim 5, and means on the outer member for enclosing the inner member the resilient means and the gearing elements.

7. A steering arm for a motor vehicle power steering apparatus including a crank having a lug, an arm member mounted to swing on the crank and having an opening for receiving the lug of the crank, whereby the crank and arm member may move independently, springs mounted in the opening of the member and engaging the lug of the crank, a gear roller journalled in the arm member, teeth on the lug engaging the teeth of said roller, and a control valve mounted on the arm member and having a disk therein connected with said gear roller.

8. A composite motor vehicle steering arm device including, a crank member adapted to be mounted on the steering shaft of a motor vehicle, an arm member mounted to swing on the crank member having means at its lower end for connecting it to a motor vehicle drag link, a rotary valve mounted entirely on the arm member, actuating means for the valve mounted on the arm member, operating means on the crank member engaging said actuating means, and yieldable means between the crank and arm members.

9. A composite motor vehicle steering arm device including, a crank member adapted to be mounted on the steering shaft of a motor vehicle, an arm member having means at its upper end for movably mounting it on the crank member, yieldable means between the members for connecting them, a valve mounted entirely on the arm member, actuating means for the valve mounted on the arm member, and operating means on the crank engaging said actuating means.

10. A self-contained steering arm device for a motor vehicle including, a crank member adapted to be mounted on the steering shaft of a motor vehicle, an arm member having one end movably surrounding the crank member and adapted to be connected to the drive link of a motor vehicle, resilient means interposed between the members for transmitting motion therebetween, a valve mounted on the arm member, and gearing carried by the arm and crank members for operating the valve.

LEONARD C. BOWLING.

REFERENCES CITED

The following references are of record in the file of this patent:

UNITED STATES PATENTS

| Number | Name | Date |
|---|---|---|
| 1,869,698 | Komfala | Aug. 2, 1932 |
| 1,939,453 | Lang | Dec. 12, 1933 |
| 1,952,034 | Bragg | Mar. 20, 1934 |
| 2,313,704 | Hey | Mar. 9, 1943 |
| 2,368,741 | Bowling | Feb. 6, 1945 |